US012762161B2

(12) United States Patent
Damnati

(10) Patent No.: US 12,762,161 B2
(45) Date of Patent: Oct. 13, 2026

(54) METHOD OF MATCHING A SET TO EVALUATE AND A REFERENCE LIST, CORRESPONDING MATCHING ENGINE AND COMPUTER PROGRAM

(71) Applicant: ORANGE, Issy les Moulineaux (FR)

(72) Inventor: Géraldine Damnati, Châtillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 269 days.

(21) Appl. No.: 18/346,145

(22) Filed: Jun. 30, 2023

(65) Prior Publication Data

US 2024/0004906 A1 Jan. 4, 2024

(30) Foreign Application Priority Data

Jul. 1, 2022 (FR) ...................................... 2206707

(51) Int. Cl.
*G06F 16/31* (2019.01)
*G06F 16/34* (2025.01)
*G06F 16/353* (2025.01)

(52) U.S. Cl.
CPC .......... *G06F 16/316* (2019.01); *G06F 16/313* (2019.01); *G06F 16/34* (2019.01); *G06F 16/353* (2019.01)

(58) Field of Classification Search
CPC ...... G06F 16/316; G06F 16/35; G06F 16/353; G06F 16/34; G06F 16/313
See application file for complete search history.

(56) References Cited

U.S. PATENT DOCUMENTS 8,650,196 B1 * 2/2014 Zhou ....................... G06F 16/35 707/737
9,047,283 B1 * 6/2015 Zhang ................. G06F 16/3346
11,481,452 B2 * 10/2022 Mattivi ................. G06F 16/374
2002/0152051 A1 10/2002 Fukushige et al.
2014/0289231 A1 * 9/2014 Palmert ................. G06F 40/284 707/723
2015/0088910 A1 3/2015 Misra et al.
2017/0024472 A1 * 1/2017 Peng ..................... G06F 16/951
(Continued)

OTHER PUBLICATIONS

French Search Report received in Priority Application No. FR 2206707, dated Apr. 25, 2023 in two pages.
(Continued)

*Primary Examiner* — Marc S Somers
(74) *Attorney, Agent, or Firm* — Knobbe, Martens, Olson & Bear, LLP

(57) ABSTRACT

A method of matching a set to be evaluated and a reference list, the reference list being associated with a reference vector representative of the entries in the list. Such a method of matching includes: calculating a distance between the reference vector and a vector, associated with the set to evaluate, representative of elements contained in the set to evaluate, the elements comprising character strings and groups of character strings; for each entry in the reference list, calculating a first matching score for the set to evaluate and for the entry in the reference list, on the basis of the distance calculated between the reference vector and the vector associated with the set to evaluate; providing a list of entries from the reference list ordered according to the first calculated matching scores.

8 Claims, 3 Drawing Sheets

(56) References Cited

U.S. PATENT DOCUMENTS

| | | | | |
|---|---|---|---|---|
| 2018/0285459 | A1 | 10/2018 | Soni et al. | |
| 2021/0248322 | A1* | 8/2021 | Modani | G06V 30/416 |
| 2022/0414137 | A1* | 12/2022 | Sewak | G06F 16/3346 |

OTHER PUBLICATIONS

Written Opinion on the Patentability of the Invention for French Application No. FR2206707 dated Apr. 28, 2023.

* cited by examiner

METHOD OF MATCHING A SET TO EVALUATE AND A REFERENCE LIST, CORRESPONDING MATCHING ENGINE AND COMPUTER PROGRAM

CROSS-REFERENCE TO RELATED APPLICATIONS

This application claims foreign priority to French Patent Application No. FR 2206707, entitled "METHOD OF MATCHING A SET TO EVALUATE AND A REFERENCE LIST, CORRESPONDING MATCHING ENGINE AND COMPUTER PROGRAM" and filed Jul. 1, 2022, the content of which is incorporated by reference in its entirety.

BACKGROUND

Technical Field

The field of the invention is that of data computer processing. More specifically, the invention relates to a technique for matching a set to evaluate and a reference list, so as to provide entries from this reference list that are closest to the set to evaluate. Such a set to evaluate can be any type of computer file or, in specific non-restrictive applications, any type of multimedia document.

Description of the Related Art

Processing increasingly large collections of data and computer files requires effective, unambiguous methods for searching them, in order to associate them with reference elements that are representative of their content.

For example, in the field of computer security, consider the case of a computer file representative of an authentication event log over a given period; it may be necessary to identify easily, from a reference list containing a set of character strings representative of passwords or cryptographic keys, those entries in this list which are closest to the authentication passwords or cryptographic keys used by different applications, in the log. Indeed, this makes it possible to identify the most frequently used forms of passwords or cryptographic keys and, on this basis, to offer users new character strings that are as different as possible from previous ones, for greater variety in authentication processes, the security and robustness of which are therefore increased.

Similarly, in a completely different field of application, namely the scientific field of automatic indexing for Knowledge Organization Systems (KOS), it is known to adopt a method for referencing documents that consists in assigning them a tag from a standardised tag repository known as a thesaurus.

The thesaurus is designed by experts in a field to cover the various relevant subjects to be indexed. Documents are indexed by one or more terms from the thesaurus, and people who make searches can use these same terms to find documents. The use of a thesaurus (standardised and therefore controlled) is preferred to the use of free keywords, which do not allow documents to be properly indexed and therefore subsequently retrieved.

Manually indexing documents to assign them relevant tags is a difficult and costly task. Automatic indexing is an area of research where the stakes are high to ensure that documents are properly indexed and improve their findable character.

The usual approaches to this task are either to perform a multi-label classification of documents using supervised learning, but in this case a large quantity of manually indexed documents is required for learning and the approach is limited as the size of the thesaurus increases.

Approaches other than supervised learning have been proposed, mainly string matching approaches which consist in inferring rules by observing manually indexed documents. These rules search for combinations of terms in documents to associate them with a thesaurus entry.

Approximate matching variants seek to compare documents statistically with the thesaurus entries and use similarity metrics based on the following approach:

1/ extracting character strings from the document and truncating them, for example to use their stems (a form independent of inflections, such as "follow" for "following", "follower", "followed", etc.) for generalisation purposes;

2/ weighting these truncated character strings based on how they are distributed in the documents of the collection;

3/ for each entry in the thesaurus, calculating a weighting coefficient of the thesaurus constituents, using a statistical calculation based on the whole thesaurus, to form a weighted vector;

4/ applying a cosine metric to the document vector formed using the weighted bag of words and to the weighted vector of each entry in the thesaurus;

5/ selecting the thesaurus entries that show highest similarity to the document.

However, these prior art approaches have several drawbacks, which stem from the fact that, on the one hand, they only consider the character strings that a document contains, independently of each other, and do not take into account whether these belong to one or more groups of character strings; and that, on the other hand, they require the character strings in a document to be weighted in relation to a collection of documents, which makes them ill-suited for managing an evolving and heterogeneous collection of documents.

There is therefore a need for a technique for matching a set to evaluate and a reference list that will address some of the shortcomings of these prior techniques.

SUMMARY

The invention responds to this need by proposing a method for matching a set to evaluate and a reference list, the reference list being associated with a reference vector representative of the entries in the list. Such a matching method comprises:

- calculating a distance (B2) between the reference vector and a vector, associated with the set to evaluate, representative of elements contained in the set to evaluate, the elements comprising character strings and groups of character strings;
- for each entry in the reference list, calculating a first matching score (Score 1) for the set to evaluate and for the entry in the reference list, on the basis of the distance calculated between the reference vector and the vector associated with the set to evaluate;
- providing a list of entries from the reference list ordered according to the first calculated matching scores.

According to one aspect, calculating the distance comprises determining a triplet list comprising at least one triplet itself comprising one of said elements of said vector, a component of the reference vector and a similarity score between said element of said vector and said component.

According to one aspect, calculating the triplet list comprises determining, for each element of said vector associated with the set to evaluate, at least one triplet.

According to one aspect, calculating the ordered list comprises, for a given element of said vector associated with the set to evaluate, n triplets corresponding to n components of the reference vector showing the highest similarity score with said element, with n a natural integer.

A component of the reference vector is understood as an element of the reference vector. This component may be associated directly with one of the entries in the list.

According to one aspect, such a matching method also comprises, for at least one element contained in the set to evaluate, calculating a centrality coefficient (B1) of the element, in the form of a sum of values of distance between the element and the other elements of the vector associated with the set to evaluate, weighted by a number of occurrences of the other elements in the set to evaluate.

Calculating a centrality coefficient in this way advantageously evaluates the representativeness of an element in relation to the set to evaluate.

According to another aspect, for each entry in the reference list, the first matching score (Score 1) is calculated in the form of a weighted sum taking into account the distance calculated between the reference vector and the vector associated with the set to evaluate and the centrality coefficient (B1) of said at least one element.

Taking this centrality coefficient into account when calculating the first matching score advantageously avoids relying on an element of the set if this is not representative of the set to evaluate and, conversely, increases the weight of the elements that are most representative of the set to evaluate when calculating the first matching score.

According to yet another aspect, such a matching method also comprises calculating a distance (B3) between the vector associated with the set to evaluate and a vector representative of constituents of the entries in the reference list.

Calculating this way advantageously avoids certain ambiguities in the case where the entries in the reference list are groups of character strings which, when associated, take a different value from the value they have when considered individually.

According to yet another aspect, such a matching method comprises:

- for each constituent of the entries in the reference list, calculating a matching coefficient for the constituent, in the form of a weighted sum taking into account the distance calculated between the vector associated with the set to evaluate and the vector representative of constituents of the entries in the reference list, and the centrality coefficient (B1) of said at least one element;
- for at least one entry in the reference list, calculating a second matching score (Score 2) for the set to evaluate and the entry in the reference list, on the basis of the matching coefficients calculated for the constituents of the entry.

According to yet another aspect, such a matching method yet comprises, for at least some entries in the reference list, calculating an overall matching score by linearly combining the first and second matching scores,

- and, in the ordered list of entries in the reference list, the entries are sorted according to the overall score calculated.

According to another aspect, a number of reference list entries provided in the ordered list takes into account a parameter belonging to the group comprising:

- a volume of the set to evaluate;
- a value from the overall scores calculated for the entries.

The invention also relates to a computer program product comprising program code instructions for implementing the method as described previously, when it is executed by a processor.

The invention also relates to a computer-readable storage medium on which is saved a computer program comprising program code instructions for implementing the steps of the matching method according to the invention as described above.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the invention can be downloaded in particular on a network, for example the Internet network.

Alternatively, the storage medium can be an integrated circuit in which the program is embedded, the circuit being adapted to execute or to be used in the execution of the above-mentioned method.

The invention further relates to an engine for matching a set to evaluate and a reference list, the reference list being associated with a reference vector representative of the entries in the list. Such a matching engine comprises a processor configured to:

- calculate a distance (B2) between the reference vector and a vector, associated with the set to evaluate, representative of elements contained in the set to evaluate, the elements comprising character strings and groups of character strings;
- for each entry in the reference list, calculate a first matching score (Score 1) for the set to evaluate and for the entry in the reference list, on the basis of the distance calculated between the reference vector and the vector associated with the set to evaluate;
- provide a list of entries from the reference list ordered according to the first calculated matching scores.

According to one feature, such a matching engine comprises a user interface and a module for displaying the ordered list of entries on the user interface.

According to another feature, such a matching engine comprises a memory configured to store in combination the set to evaluate and first Q entries of the ordered list showing a first matching score higher than a determined matching score, where Q is a natural integer.

According to yet another feature, the processor of such a matching engine is also configured to execute the steps of the method as described above.

The aforementioned corresponding matching engine, data medium and computer program have at least the same advantages as those provided by the matching method according to the present invention.

BRIEF DESCRIPTION OF THE DRAWINGS

Other purposes, features and advantages of the invention will become more apparent upon reading the following description, hereby given to serve as an illustrative and non-restrictive example, in relation to the figures, among which.

DETAILED DESCRIPTION OF CERTAIN ILLUSTRATIVE EMBODIMENTS

The general principle of the invention is based on the calculation of different weighted combinations of distances between a vector representative of a start set to evaluate and a vector representative of a reference list, allowing for the provision of a list of entries from the reference list, ordered according to the results of this calculation, in order to identify which of these entries are the most relevant to associate with the start set to evaluate.

In relation to the figures, a specific embodiment of the invention in the application context of an automatic or semi-automatic indexing of multimedia documents is now presented. The invention is of course not limited to this type of application, which is only provided here as an example.

Indeed, the proposed matching technique may be used in particular to predict the tags (also known as labels or entries in a reference list) which can be associated with a document from a list of predefined tags grouped together in what is known as a thesaurus.

A thesaurus is a list of terms, either flat or structured as a tree. The thesaurus terms are generally referred to as entries when referring to the analysis of the thesaurus and as tags when referring to the result of an automatic or semi-automatic indexing process. A thesaurus entry (for example: "mobile banking") may be made up of one or more character strings, known as the constituents (in this example, two constituents: "banking" and "mobile") of the entry.

A document may be a textual document or a video or audio document for which an automatic transcription or subtitle is available, so that the document is associated with textual content within which it is possible to identify and search for certain character strings (for example, words), or groups of character strings (for example, simple or extended phrases).

Tag prediction is based on the analysis of the document's textual content, which may be directly extracted in the case of a native text document, or come from an OCR (Optical Character Recognition) scan in the case of a digitised document, or even result from an automatic speech transcription in the case of an audio or video document.

Figure 1:
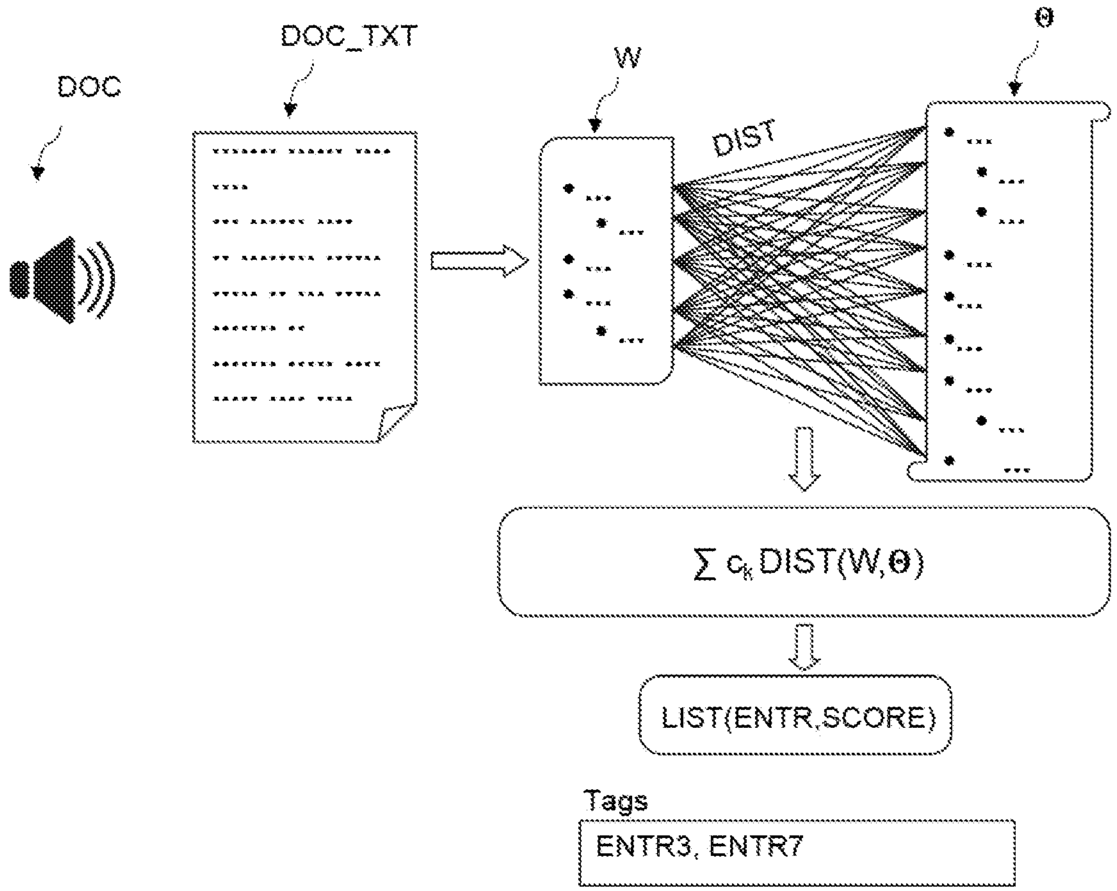
FIG. 1 illustrates, in the form of a schematic flowchart, the general principle of the matching technique according to an embodiment of the invention.

FIG. 1 illustrates, in the form of a schematic flowchart, the general principle of the matching technique according to an embodiment of the invention.

It is assumed in this example that a computer file DOC containing an audio file is available. Such a computer file may be a video extracted from an audiovisual archive, or an audio recording of a professional or commercial conversation, for example.

Using techniques which are not the subject of the present invention (for example, automatic transcription), it is possible to associate the file DOC with its text content DOC_TXT, which comprises a succession of character strings, each character being illustrated by a dot in FIG. 1.

By parsing this succession of character strings, using a technique which is not the subject of the present invention, but which is, for example, described in patent application FR 3 041 125 A1 in the name of the Applicant, it is possible to:

- determine the syntactic category of each character string, or word;
- determine the lemma for each character string (i.e. the "canonical" form of the word, as found in the dictionary);
- segment the groups of character strings into syntactic groups (for example, noun group, verbal group, prepositional group).

It is therefore possible to automatically extract from the textual content DOC_TXT:

- character strings corresponding to keywords in the form of lemmas;
- groups of character strings corresponding to keywords in the form of an immediate context, i.e. in the form of simple phrases;
- groups of character strings corresponding to keywords in the form of an extended context, i.e. in the form of extended phrases.

For example, if a speaker in the start video file DOC says the words "Livebox® real life test", it is possible to extract from the associated text transcript DOC_TXT:

- a group of character strings "Livebox® real life test", corresponding to an extended phrase;
- a group of character strings "Livebox® test", corresponding to a simple phrase;
- a group of character strings "real life", corresponding to a simple phrase;
- character strings "test", "Livebox®", "real" and "life", each corresponding to a single word.

These three levels (lemma, immediate context, extended context) make the meaning of the textual content DOC_TXT from the start file DOC easier to capture, and therefore improve the matching result of this start file with the reference list forming the thesaurus. Indeed, it is understood that, if an entry in the reference list comprises the group of character strings "in vivo test", using the aforementioned three extraction levels ensures better matching of the file DOC with this thesaurus entry, compared with an extraction that would only extract single words or lemmas from the document.

However, it should be noted that the use of this extraction method described in the prior application FR 3 041 125 A1 is only one possible, but non-restrictive, example of embodiment.

It is from this information that the keywords are selected with their immediate and extended contexts, based on rules about categories and syntactic groups. Using this method eliminates the need to use an a priori dictionary of keywords, as an a priori dictionary cannot cover all the contexts contained in the documents (for example, genetic determinism), and even less so extended contexts (genetic determinism problem).

As a consequence, automatically extracting elements contained in the start file DOC_TXT, for all three levels suggested, calls for the following sequence of steps:

- implementation of character string grouping rules;
- selection;
- determination of the surface form.

These steps will not be described in more detail here, but the reader may refer if necessary to the prior application FR 3 041 125 A1.

It is therefore assumed that, on the basis of this automatic extraction method, or any other suitable extraction method, a set of elements contained in the document DOC_TXT, namely character strings and groups of character strings, have been identified. A vector representation W of all these elements contained in the file DOC_TXT and representative of its content is adopted.

A vector representation Θ of all the entries in a reference list, or thesaurus, that are to be matched with the start file DOC, is also adopted.

The matching technique according to an embodiment of the invention is based on the calculation of different values of distance DIST between vectors W representative of the start file DOC and Θ representative of the entries in the reference list, and more precisely on the calculation of different values of distance DIST between each of the constituent elements of vector W on the one hand, and vector Θ on the other hand, between each of the constituent entries of vector Θ on the one hand, and vector W on the other, but also between each of the constituent elements of vector W and vector W itself.

As shown diagrammatically in FIG. 1, these different calculated distances are combined in the form of a weighted sum ($\Sigma c_k$DIST(W, Θ)), which is used to deduce a matching score associated with each of the entries of vector Θ, representative of its relevance in relation to the textual content of the start file DOC.

These entries can then be sorted according to their matching score, and provided in the form of an ordered list LIST(ENTR, SCORE). By selecting the most relevant entries from this ordered list, it is possible to deduce the thesaurus tags to be matched with the start computer file DOC (for example, thesaurus entries ENTR3 and ENTR7).

Figure 2:
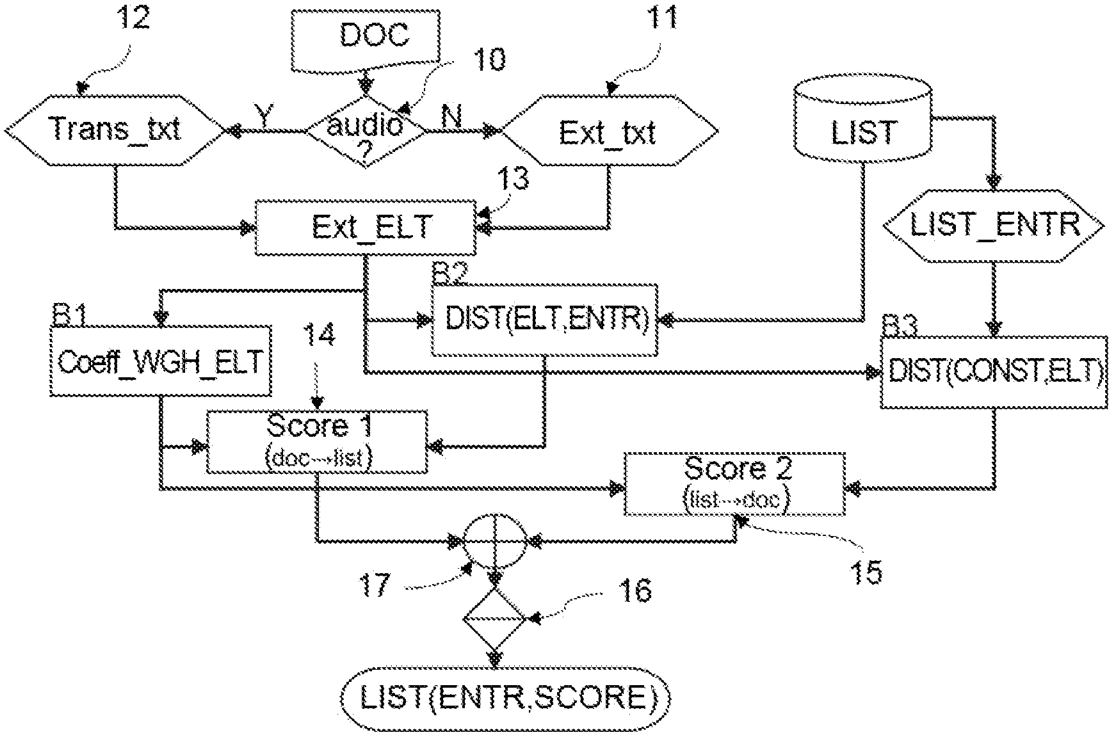
FIG. 2 shows a more detailed flowchart of the various steps implemented by the matching method according to an embodiment of the invention.

FIG. 2 shows a more detailed flowchart of the various steps implemented by the matching method according to an embodiment of the invention.

In this example, it is considered that a start set to evaluate, noted DOC, is available, which may be any type of computer file, and in particular a multimedia document. A flat or tree-structured reference list, noted LIST, is also available, for example a thesaurus comprising a set of entries.

In a first step referenced 10, the nature of the start file DOC is evaluated to determine whether it includes textual content that can be extracted (Ext_txt 11), or whether it is necessary to transcribe audio content into textual content (Trans_txt 12). From this textual content, it is possible, in a step referenced 13, to extract elements contained in the start file DOC, in the form of character strings or groups of character strings, as described above in relation to FIG. 1.

Preferably, a vector representation of these elements is adopted, for example in the form of vector W in FIG. 1, which enables this matching method to be based on a notion of semantic similarity allowing words or expressions to be compared with each other (for example the Simbow similarity metric (described by Charlet D., & Damnati G. (2017, August) in the article "Simbow at semeval-2017 task 3: Soft-cosine semantic similarity between questions for community question answering", *Proceedings of the* 11*th International Workshop on Semantic Evaluation* (*SemEval*-2017) (pp. 315-319)) or a cosine metric based on embeddings (described by Reimers, Nils, and Iryna Gurevych in the article "Sentence-BERT: Sentence Embeddings using Siamese BERT-Networks", *Proceedings of the* 2019 *Conference on Empirical Methods in Natural Language Processing and the* 9*th International Joint Conference on Natural Language Processing* (*EMNLP-IJCNLP*), 2019)).

As illustrated in FIG. 2, this similarity metric is used at three levels:

at level referenced B1, to calculate a weighting of the elements representative of the document DOC in the form of a "centrality" score COEFF_WGH_ELT;

at level referenced B2, to calculate the semantic similarity DIST(ELT, ENTR) between the elements ELT representative of the document DOC and the entries ENTR of the thesaurus LIST;

at level referenced B3, to calculate the semantic similarity DIST(CONST,ELT) between the constituents CONST of the thesaurus entries ENTR and the elements ELT representative of the document DOC.

The general notion of semantic similarity, on which the matching method illustrated in FIG. 2 is based, is described below.

Let X and Y be two sets, Y representing a reference collection from which similar items are to be searched for and X representing a query.

From the elements of Y, elements similar to the elements of X are searched for.

Sim(X→Y) is used to obtain, for each element of X, an ordered list of the elements of Y that are most similar.

Suppose, according to an embodiment, for reasons of efficiency, that only the max closest neighbours are retained as a maximum (similarity considered as null beyond that).

In this case, it can be considered that implementing a semantic similarity technology produces a set of triplets ($x_i$, $y_j$, $\sigma^Y(x_i, y_j)$) (where $\sigma^Y(x_i, y_j)$ is the value of semantic similarity between $x_i$ and $y_j$) such that:

$$Sim(X \to Y) = \left\{\left(x_i,\ y_{\pi(Y;x_i;n)},\ \sigma^Y\left(x_i,\ y_{\pi(Y;x_i;n)}\right)\right),\ 1 \le i \le |X|,\ 1 \le n \le \max\right\}$$

Where $\pi(Y; x_i; n)$ is the index of the $n^{th}$ nearest neighbour of $x_i$ among the elements of Y.

This semantic similarity may, for example, be expressed in the following form:

$$\cos_M(X, Y) = \frac{X^t \cdot M \cdot Y}{\sqrt{X^t \cdot M \cdot X} \cdot \sqrt{Y^t \cdot M \cdot Y}}$$

Consisting of $$X^t \cdot M \cdot Y = \sum\nolimits_{i=1}^{n} \sum\nolimits_{j=1}^{n} x_i m_{i,j} y_j$$

where M is a matrix in which the element $m_{i,j}$ expresses a semantic relation between the word i and the word j (for example, the words i and j are synonyms, or appear in similar contexts when observing large volumes of text, etc.).

The claimed matching technique is therefore advantageous in that, thanks to this approach based on a semantic similarity distance calculation, it is capable of suggesting the thesaurus entry "vehicle" if the document to evaluate refers to "car" or "truck" without ever using the term "vehicle".

In the example shown in FIG. 2, it is assumed that the vector W representative of the N elements contained in the start file DOC is written in the form:

$$W = \{w_1, \ldots, w_i, \ldots, w_N\}.$$

This vector W contains all the keywords $w_i$ of the document, obtained for example using the method described in the prior patent application FR 3 041 125 A1. Each element $w_i$ can be a character string (i.e. a single word (for example, "resource")), or a group of character strings (i.e. a simple phrase (for example, "hidden resource"), or an extended phrase (for example, "hidden resource in the house"). Each element $w_i$ is associated with its number of occurrences $occ(w_i)$ in the document DOC.

In a simplified embodiment of the invention, the semantic similarity evaluation is limited to level B2, excluding levels B1 and B3.

Taking the notations above, calculation of the distance DIST(ELT, ENTR) between the elements ELT representative of the document DOC and the entries ENTR of the thesaurus LIST is written in the form $Sim(W \rightarrow \Theta)$, and enables the semantic similarity of the document keywords to be evaluated in relation to the thesaurus entries, by calculating a distance between each element $w_i$ of vector W and vector $\Theta$.

Suppose that only the 100 closest neighbours are retained as a maximum (similarity considered as null beyond that). This distance calculation then produces a set of triplets ($w_i$, $\theta_j$, $\sigma^{\Theta}$) ($w_i$, $\theta_j$) such that:

$$Sim(W \rightarrow \Theta) = \left\{\left(w_i, \theta_{\pi(\Theta;w_i;n)}, \sigma^{\Theta}\left(w_i, \theta_{\pi(\Theta;w_i;n)}\right)\right), 1 \leq i \leq |W|, 1 \leq n \leq \min(100, v(\Theta; w))\right\}$$

Where $v(\Theta; w_i)$ is the number of neighbours of $w_i$ from the elements of $\Theta$ and $\pi(\Theta; w_i; n)$ is the index of the $n^{th}$ closest neighbour of w from the elements of $\Theta$.

For each entry ENTR of the thesaurus LIST, a matching score, noted Score 1, may then be calculated (step referenced 14), representing the similarity of the elements ELT of the start file DOC to the entry $\theta_j$ of the thesaurus considered, in the form:

$$\rho_1(\theta_j) = \sum_{i=1,|W|} \sigma^{\Theta}(w_i, \theta_j)$$

In a step referenced 16, the thesaurus entries $\theta_j$ are sorted, for example in descending order of the score Score 1, $\rho_1(\theta_j)$, and ordered accordingly in a list LIST(ENTR,SCORE).

According to a first embodiment, this ordered list can be displayed on a user interface, to help the latter in choosing the most relevant tags of the thesaurus to index the start file DOC. Users can then decide whether they want to validate the choices suggested to them on the user interface or not.

According to another embodiment, the start file DOC is indexed in a fully automated manner: for example, a relevance threshold is set for the score, and only the thesaurus entries whose score Score 1 is higher than the determined relevance threshold are retained. According to another approach, the number of tags is determined based on the volume of the start file (for example, depending on the duration of a video, several indexing increments respectively associated with a number of tags to be selected in the ordered list are suggested), and the determined number of tags is retained, running through the ordered list in descending score order.

Using calculation of the distance B2 only already offers many advantages compared with the prior techniques, in particular with the technique described in the article by Boukhari K., & Omri M. N. (2020), "Approximate matching-based unsupervised document indexing approach: application to biomedical domain", Scientometrics, 124(2), 903-924.

Indeed, this prior approximate matching technique seeks to compare documents statistically with the thesaurus entries and uses similarity metrics based on the following approach:

1/ extracting words from the document and using the stems (i.e. a form independent of inflections, such as "follow" for "following", "follower", "followed", etc.) for generalisation purposes;

2/ weighting these stems based on how they are distributed in documents that are part of a larger collection of documents;

3/ for each entry in the thesaurus, calculating a weighting of the thesaurus constituents, using a statistical calculation based on the whole thesaurus, to form a weighted vector;

4/ applying a cosine metric to the document vector formed using the weighted bag of words and to the weighted vector of each entry in the thesaurus;

5/ selecting the thesaurus entries that show highest similarity to the document.

This prior technique thus shows various limits: as it is based on cosine similarity, only entries in the thesaurus explicitly having their constituent words or stems in the document could be selected.

However, it is advisable to have a statistical method capable of suggesting the thesaurus entry "vehicle" if the document refers to "car" or "truck" without ever using the term "vehicle".

The semantic similarity techniques implemented in the claimed matching technique, which are based on vector representations ("embeddings") of character strings or groups of character strings, make this possible.

As a consequence, the use of a semantic similarity metric in step B2 of FIG. 2 ensures better generalisation than the simple stemming of words.

Furthermore, this prior approach only takes into consideration the words in the document independently of each other. In contrast, the calculation step B2 of FIG. 2 is based on vector W containing all the relevant elements of document DOC, i.e. both character strings (single words) and groups of character strings (phrases, i.e. key words in context), which makes it possible to use more relevant expressions in the document.

However, in a more complete embodiment of the claimed matching technique, all the steps and calculations shown diagrammatically in FIG. 2 are implemented, for an improved indexing result.

In a step B1, a distance between each element $w_i$ of the start file DOC and all the other elements of this file is therefore calculated, i.e. $Sim(W \rightarrow W)$, which is used to evaluate the semantic similarity of the document's keywords to one another.

A "centrality" coefficient can thus be calculated for each element $w_i$: indeed, the more similar an element (or keyword) is to other elements in the document, the more central it is, i.e. the more it reflects the subject of the document DOC.

The calculation of this weighting coefficient, which reflects the "centrality" of the words in the document, is noted Coeff_WGH_ELT in FIG. 2. For the element $w_i$, it is noted:

$$\gamma(w_i) = \sum_{n=1,max} occ\left(w_{\pi(W;w_i;n)}\right)\sigma^W\left(w_i, w_{\pi(W;w_i;n)}\right)$$

$\gamma(w_i)$ is the sum of semantic similarities between the keyword $w_i$ and the other keywords in the document, weighted by the number of occurrences occ of each of these keywords.

The step referenced 14 for calculating the first matching score Score 1 can advantageously take into account this centrality coefficient calculated in step B1.

For each entry in the thesaurus $\theta_j$, this first matching score Score 1, also noted $\rho_1(\theta_j)$, is expressed as the weighted sum, for all the keywords in the document, of the similarity of elements $w_i$ of the document DOC to the thesaurus entry $\theta_j$, weighted by the centrality $\gamma(w_i)$ of the keyword. In an embodiment variant, it is expressed in the following form:

$$\rho_1(\theta_j) = \sum_{i=1,|W|} \sigma^\Theta(w_i, \theta_j)^2 \sqrt{\gamma(w_i)}$$

In this variant, for a thesaurus entry $\theta_j$, $\rho_1(\theta_j)$ is the sum, for all the keywords in the document, of the squared similarity between the keywords and the thesaurus entry, weighted by the square root of the centrality coefficient of the keywords.

Indeed, this variant emphasises the importance of elements $w_i$ having a similarity $\sigma^\Theta(w_i, \theta_j)$ to the thesaurus entry $\theta_j$ close to 1, and therefore allows them to be given greater consideration. Of course, one could consider raising them to a power L greater than 2, to increase this accentuation effect further, for example:

$$\rho_1(\theta_j) = \sum_{i=1,|W|} \sigma^\Theta(w_i, \theta_j)^L \sqrt[L]{\gamma(w_i)}$$

Thus, unlike prior art techniques (and in particular the aforementioned approximate matching technique by Boukhari et al.), the claimed matching technique proposes an approach that is independent of the collection of documents, and is instead based on a weighting of the terms in relation to the document only, which makes an evolving or heterogeneous collection easier to manage.

Taking into account such a centrality coefficient advantageously resolves a problem frequently encountered in an automatic document indexing process, which consists in using a word in the document that is not sufficiently representative of its content.

For example, in a video which describes the process for developing a residential gateway in the Applicant's laboratories, if the person speaking says "we have hidden resources in the house", the word "house" is used in an idiomatic expression to mean the Applicant's company in a broader sense: it would therefore be a misinterpretation to propose a tag concerning the "connected house" for example. By taking into account the centrality coefficient in calculation step B1, this type of misinterpretation can be avoided.

In addition, the semantic similarity calculation is also used at level B3, to measure the distance DIST(CONST, ELT) between the constituents CONST of the thesaurus entries ENTR and the elements ELT representative of the document DOC.

Let $\Theta=\{\theta_1, \ldots, \theta_j, \theta_M\}$ be the thesaurus consisting of M entries ENTR.

Let $C=\{c_1, \ldots, c_k, \ldots, c_P\}$ be the set of constituents of the thesaurus entries: a constituent is a character string, i.e. a single word (for example "banking" and "mobile" for the entry "mobile banking"), while an entry may be a group of character strings.

The calculation of the distance, in step B3, between vector C of the constituents of the thesaurus entries and vector W of the document DOC elements, makes it possible to calculate, for each constituent $c_k$ of the thesaurus, a coefficient $\beta$(c k), which is the sum of similarities between this constituent and the keywords in the document, weighted by the centrality coefficient of the keywords in the document.

In an embodiment variant, this coefficient $\beta(c_k)$ is expressed in the form:

$$\beta(c_k) = \sum_{n=1,max} \sigma^W\left(c_k, w_{\pi(W;c_k;n)}\right)^2 \sqrt{\gamma\left(w_{\pi(W;c_k;n)}\right)}$$

Where similarities $\sigma^W$ are squared, and where centrality coefficients are replaced by their square roots, to emphasise the importance of similarities close to 1.

A second matching score, noted Score 2, is then deduced for a thesaurus entry $\theta_j$ made up of $v(\theta_j)$ constituents $\theta_j=\{c_i, 1\leq l\leq v(\theta_j)\}$ $$\rho_2(\theta_j) = \left(\prod_{l=1,v(\theta_j)} \beta(e_l)\right)^{1/v(\theta_j)}$$

For example, for a thesaurus entry $\theta_j$="mobile banking", $v(\theta_j)=2$, $e_1$="banking" and $e_2$="mobile" and the following is found:

$$\rho_2(\text{banque mobile}) = (\beta(\text{banque})\beta(\text{mobile}))^{1/2}$$

Such a calculation B3 avoids proposing a specific tag if its meaning is different from the general meaning; for example, one of the difficulties encountered in such an automatic indexing process is that the "Social network" tag should not be proposed for a document dealing with the network in a broader sense. Similarly, the "Mobile banking" tag should not be proposed for a document dealing with mobile phones. Calculation B3 is an advantageous way of resolving this type of ambiguity.

In a step referenced 17, an overall matching score can then be calculated from the first and second matching scores(Score 1, or $\rho_1(\theta_j)$, and Score 2, or $\rho_2(\theta_j)$), for example by linearly combining these two scores:

$$\rho(\theta_j) = \lambda\rho_1(\theta_j) + (1-\lambda)\rho_2(\theta_j)$$

The matching method produces, for each document DOC, a list of tags $\theta_j$ from the thesaurus LIST, sorted according to the final score $\rho(\theta_j)$. The number of tags $\theta_j$ selected can be adjusted according to the scores $\rho(\theta_j)$ and the length of the document DOC (or its duration in the case of a video or an audio document).

The matching technique described above can advantageously be applied to automatic document indexing, or as an indexing aid by suggesting thesaurus entries on an HMI interface that a user can validate or invalidate. It is advantageously applicable to audiovisual archive indexing.

The indexing notion may also be applied to contexts associated with Customer Relationship, such as Speech Analytics, where the technique may be used to tag conversations using a thesaurus developed by business experts. Indeed, a thesaurus is defined by trades as a list of topics that may be raised in conversations, and content analytics can predict these topics as tags, making it easier to index conversations and analyse them by grouping the topics raised.

The matching technique may also find an interesting application framework in the field of the analysis of project progress meetings: project managers may define the list of tags that best index the information linked to their project and thus index, in the same repository, the documents produced in their project and the associated meetings.

The advantage of this matching technique is that it offers accurate indexing without requiring any learning to obtain reliable and accurate indexing, which is therefore inexpensive.

Figure 3:
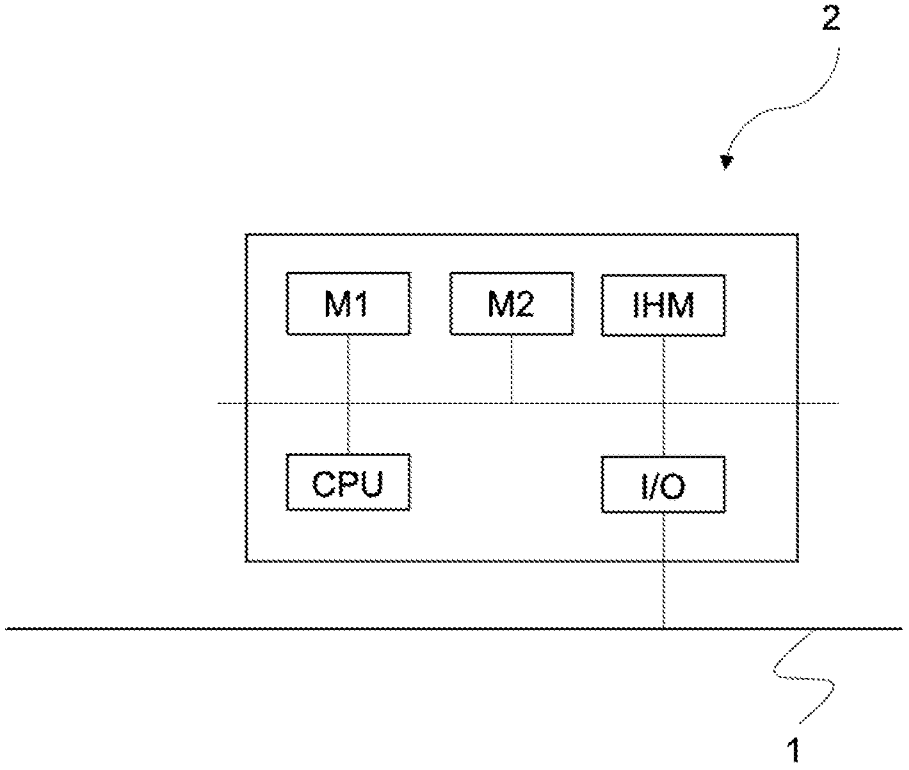
FIG. 3 describes the hardware structure of a matching engine according to an embodiment of the invention.

In relation to FIG. 3, the hardware structure of a matching engine 2 according to an embodiment of the invention is now described.

Such a matching engine 2 comprises a volatile memory M1 (for example, a RAM memory), a processing unit CPU equipped for example with a processor and controlled by a computer program, representative of a unit calculating distances between vectors as well as matching scores, stored in a read-only memory M2 (for example, a ROM memory or hard disk). At initialisation, the code instructions of the computer program are for example loaded into the volatile memory M1 before being executed by the processor of the processing unit CPU. The volatile memory M1 contains in particular vector W of the elements representative of the set to evaluate and extracted from the latter, and the vector Θ representative of the reference list, described above in relation to FIGS. 1 and 2. The processor of processing unit CPU controls the calculation of the various distances between vectors and centrality coefficients B1, B2 and B3, the calculation of the various resulting matching scores (Score 1, Score 2 and overall score), as well as the construction of the ordered list of entries from the reference list which are most relevant for the set to evaluate, and possibly its display on an HMI user interface unit.

The matching engine 2 also comprises an input/output unit I/O connected to a communication bus referenced 1, through which it receives, for example, vector W of the elements representative of the set to evaluate, coming from an extraction module not shown. Alternatively, such a module for extracting elements representative of the set to evaluate, which is configured to build up vector W, may be integrated into the matching engine 2.

The volatile memory M1 is also configured to store in combination the set to evaluate and the entries from the reference list that are most relevant in relation to this set: for example, the first Q entries in the ordered list showing a matching score higher than a given matching score, where Q is a natural integer. In an embodiment where the set to evaluate is a multimedia document, the volatile memory M1 stores, for example in combination, the multimedia document (for example a video or a telephone conversation) and the Q tags from the thesaurus that are most relevant for indexing the multimedia document. It can be decided to retain the Q tags showing the highest matching scores in the ordered list, and/or to retain only the Q tags showing a matching score greater than a determined matching score threshold.

The term "unit" can correspond to a software component as well as to a hardware component or a set of hardware and software components, a software component itself corresponding to one or more computer programs or sub-programs, or more generally, to any element of a program capable of implementing a function or set of functions.

FIG. 3 only shows a particular one of several possible ways of realising the matching engine 2, so that it executes the steps of the method detailed above, in relation to FIGS. 1 and 2 (in any of the various embodiments, or in a combination of these embodiments). Indeed, these steps may be implemented either on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the matching engine 2 is realised with a reprogrammable computing machine, the corresponding program (i.e. the sequence of instructions) may be stored (or not) in a removable storage medium (such as, for example, a floppy disk, CD-ROM or DVD-ROM), this storage medium being partially or totally readable by a computer or a processor.

The invention claimed is:

1. A method of indexing a computer file with tags from a reference list, the reference list being associated with a reference vector representative of the tags in the reference list, wherein the method comprises, in a matching engine comprising a hardware processor:

associating textual content with the computer file;

automatic extracting, from the textual content associated with the computer file, character strings and groups of character strings corresponding to keywords;

calculating a distance between the reference vector and a vector associated with the computer file, the vector being representative of the keywords contained in the computer file;

for each tag in the reference list:

calculating a matching score for the keywords of the computer file and for the tag in the reference list, on the basis of the distance calculated between the reference vector and the vector associated with the computer file, the calculating of the matching score comprising:

for at least one keyword contained in the computer file, calculating a centrality coefficient of the keyword, in the form of a sum of values of distance between the keyword and the other keywords of the vector associated with the computer file, weighted by a number of occurrences of the other keywords in the computer file;

the matching score being calculated in the form of a weighted sum taking into account the distance calculated between the reference vector and the vector associated with the computer file and the centrality coefficient of the at least one keyword;

calculating a distance between the vector associated with the computer file and a vector representative of constituents of the tags in the reference list, the calculating of a distance comprising:

for each constituent of the tags in the reference list, calculating a matching coefficient for the constituent, in the form of a weighted sum taking into account the distance calculated between the vector associated with the computer file and the vector representative of constituents of the tags in the reference list, and the centrality coefficient of the at least one keyword; and for at least one tag in the reference list, calculating a second matching score for the computer file and the entry in the reference list, on the basis of the matching coefficients calculated for the constituents of the tag;

providing a list of tags from the reference list, ordered according to the calculated matching scores and second matching scores; and automatic indexing of the computer file with tags in the ordered list of tags, without previous learning nor human intervention.

2. The indexing method according to claim 1, wherein the method further comprises, for at least some tags in the reference list, calculating an overall matching score by linearly combining the matching score and the second matching score, and wherein, in the ordered list of tags in the reference list, the tags are sorted according to the overall score calculated.

3. The indexing method according to claim 2, wherein a number of reference list tags provided in the ordered list takes into account a parameter belonging to a group comprising:

a volume of the computer file; and a value from the overall scores calculated for the tags.

4. The indexing method according to claim 1, wherein at least some of the calculated distances between vectors take into account a semantic similarity between keywords and/or tags of the vectors.

5. A processing circuit comprising a processor and a memory, the memory storing program code instructions of a computer program for executing the indexing method according to claim 1, when the computer program is executed by the processor.

6. An engine for indexing a computer file with tags from a reference list, the reference list being associated with a reference vector representative of the tags in the reference list, wherein the engine comprises a hardware processor configured to:

associate textual content with the computer file;

automatically extract, from the textual content associated with the computer file, character strings and groups of character strings corresponding to keywords;

calculate a distance between the reference vector and a vector associated with the computer file, the vector being representative of the keywords contained in the computer file;

for each tag in the reference list:

calculate a matching score for the keywords of the computer file and for the tag in the reference list, on the basis of the distance calculated between the reference vector and the vector associated with the computer file, the calculating of the matching score comprising:

for at least one keyword contained in the computer file, calculating a centrality coefficient of the keyword, in the form of a sum of values of distance between the keyword and the other keywords of the vector associated with the computer file, weighted by a number of occurrences of the other keywords in the computer file;

the matching score being calculated in the form of a weighted sum taking into account the distance calculated between the reference vector and the vector associated with the computer file and the centrality coefficient of the at least one keyword;

calculate a distance between the vector associated with the computer file and a vector representative of constituents of the tags in the reference list, the calculating of a distance comprising:

for each constituent of the tags in the reference list, calculating a matching coefficient for the constituent, in the form of a weighted sum taking into account the distance calculated between the vector associated with the computer file and the vector representative of constituents of the tags in the reference list, and the centrality coefficient of the at least one keyword; and for at least one tag in the reference list, calculating a second matching score for the computer file and the entry in the reference list, on the basis of the matching coefficients calculated for the constituents of the tag;

provide a list of tags from the reference list, ordered according to the calculated matching scores; and automatically index the computer file with the tags in the ordered list of tags, without previous learning nor human intervention.

7. The indexing engine according to claim 6, wherein the indexing engine comprises a user interface and a module for displaying the ordered list of tags on the user interface.

8. The indexing engine according to claim 6, wherein the indexing engine comprises a memory configured to store in combination the set to evaluate and first Q entries of the ordered list showing a first matching score higher than a determined matching score, where Q is a natural integer.

* * * * *